United States Patent [19]

Mounts et al.

[11] 4,101,160

[45] Jul. 18, 1978

[54] SEMI-MODULAR CAB JOINT LINE SEALING ARRANGEMENT

[75] Inventors: William T. Mounts, Chillicothe; Joseph B. Stratton, Peoria, both of Ill.

[73] Assignee: Caterpillar Tractor Co., Peoria, Ill.

[21] Appl. No.: 814,521

[22] Filed: Jul. 11, 1977

[51] Int. Cl.² ............................................. B62D 23/00
[52] U.S. Cl. .................................... 296/35 R; 248/15
[58] Field of Search .......................... 296/35 R, 35 A; 280/150 C; 248/15, 18, 21, 22

[56] References Cited

U.S. PATENT DOCUMENTS

| 3,834,754 | 9/1974 | Zajichek | 296/35 R |
| 4,012,071 | 3/1977 | Jones | 296/35 R |

*Primary Examiner*—Philip Goodman
*Attorney, Agent, or Firm*—Wegner, Stellman, McCord, Wiles & Wood

[57] ABSTRACT

A cab joint line sealing arrangement for use in a vehicle having a base portion and a cab. The sealing arrangement includes a channel structure secured to the cab to define a projecting channel extending lengthwise along the cab peripheral portion. The web of the channel structure is provided with spaced openings and the vehicle base portion is provided with a corresponding plurality of threaded securing devices for receiving a complementary threaded securing device extended through the channel openings and arranged to clamp the channel web to the vehicle base portion. A compressible seal is provided adjacent the channel to extend lengthwise parallel thereto for sealing the cab to the vehicle base portion as an incident of the securing of the cab to the base portion by the threaded securing elements.

14 Claims, 3 Drawing Figures

SEMI-MODULAR CAB JOINT LINE SEALING ARRANGEMENT

BACKGROUND OF THE INVENTION

1. Field of the Invention

This invention relates to vehicle constructions and in particular to means for sealing the peripheral portion of a cab to a base portion of the vehicle.

2. Description of the Prior Art

In one form of vehicle, such as a tractor, a cab is mounted to a base portion thereof. It is desirable in such installations to provide some means for sealing the cab to the base portion so as to effectively prevent free transmission of sound therebetween for improved operating conditions in the cab compartment.

As the cab and base portions intended to be sealingly joined may comprise sheet metal portions, it has been found difficult to provide a uniform sealing of the joint line.

Further, the configuration of the joint line is relatively complex defining, as it does, both the operator's platform and the dash portion of the vehicle base portion, thereby making further difficult the sealing of the cab to the base portion.

One attempted solution to the problem has been to weld the cab to the base portion. However, this has the serious disadvantage of inability to remove the cab when desired to provide free access to the operator station.

A number of joint line arrangements have been used to provide removable securing of the cab to the vehicle base portion but have had the serious disadvantages of incomplete seals and difficulty of manufacture because of the substantial number of threaded elements required along the length of the joint lines. The relative flexibility of the sheet metal portions of the structure have further aggravated the problem of maintaining the seal along the entire length of the joint line.

SUMMARY OF THE INVENTION

The present invention comprehends an improved joint line sealing arrangement for use in a vehicle having a cab and a base portion to which the cab is removably secured. The joint line seal is arranged to seal the peripheral portion of the cab to the base portion which may include an operator's station and a dash.

In the illustrated embodiment, channel means are secured to the cab to define a projecting channel extending lengthwise along the cab peripheral portion. Cooperating threaded securing means are provided having one portion secured to the vehicle base portion and a second portion having a manipulating part received in the channel permitting threading of the second portion to the first portion to secure the channel to the vehicle base portion along the length of the channel web.

Compressible sealing means are provided adjacent the channel means extending lengthwise parallel thereto and having an uncompressed thickness greater than the projection of the channel means whereby the sealing means is sealingly compressed between the cab peripheral portion and the vehicle base portion as an incident of the securing of the cab to the base portion by the threaded securing means.

The channel effectively defines with the peripheral portion of the cab a box section affording a high stiffness at the peripheral portion for improved positive compression of the sealing means along the extent of the joint line means.

In the illustrated embodiment, the threaded means secured to the base portion of the vehicle comprises a plurality of nuts which may be welded to the base portion at spaced intervals corresponding to the spacing of a plurality of openings provided in the channel web.

The openings in the channel web may be relatively large so as to permit adjustment of the bolt means extended therethrough to minimize the tolerance requirements in the location of the nuts while yet assuring a positive clamping of the peripheral portion of the cab to the base portion of the vehicle along the entire length of the joint line structure.

The bolts may be provided with a relative large diameter washer so as to provide a further positive clamping of the channel web and, thus, the peripheral portion of the cab to the base portion of the vehicle.

The peripheral portion of the cab may be provided with a plurality of openings overlying the channel in alignment with the openings through the web portion thereof to provide access to the threaded securing means in the channel as for manipulating the same during threaded securing or releasing operations. The openings in the peripheral portion of the cab may be selectively closed by closure elements which may be effectively flush with the cab peripheral portion.

In the illustrated embodiment, the seal comprises a hollow strip which is removably secured to the peripheral portion of the cab adjacent the channel means by a mounting element secured to the cab.

In the illustrated embodiment, the sealing strip is slidably received in the mounting element.

Thus, the joint line sealing means of the present invention is extremely simple and economical of construction while yet providing the highly improved positive sealing of the cab to the base portion of the vehicle as discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 3:
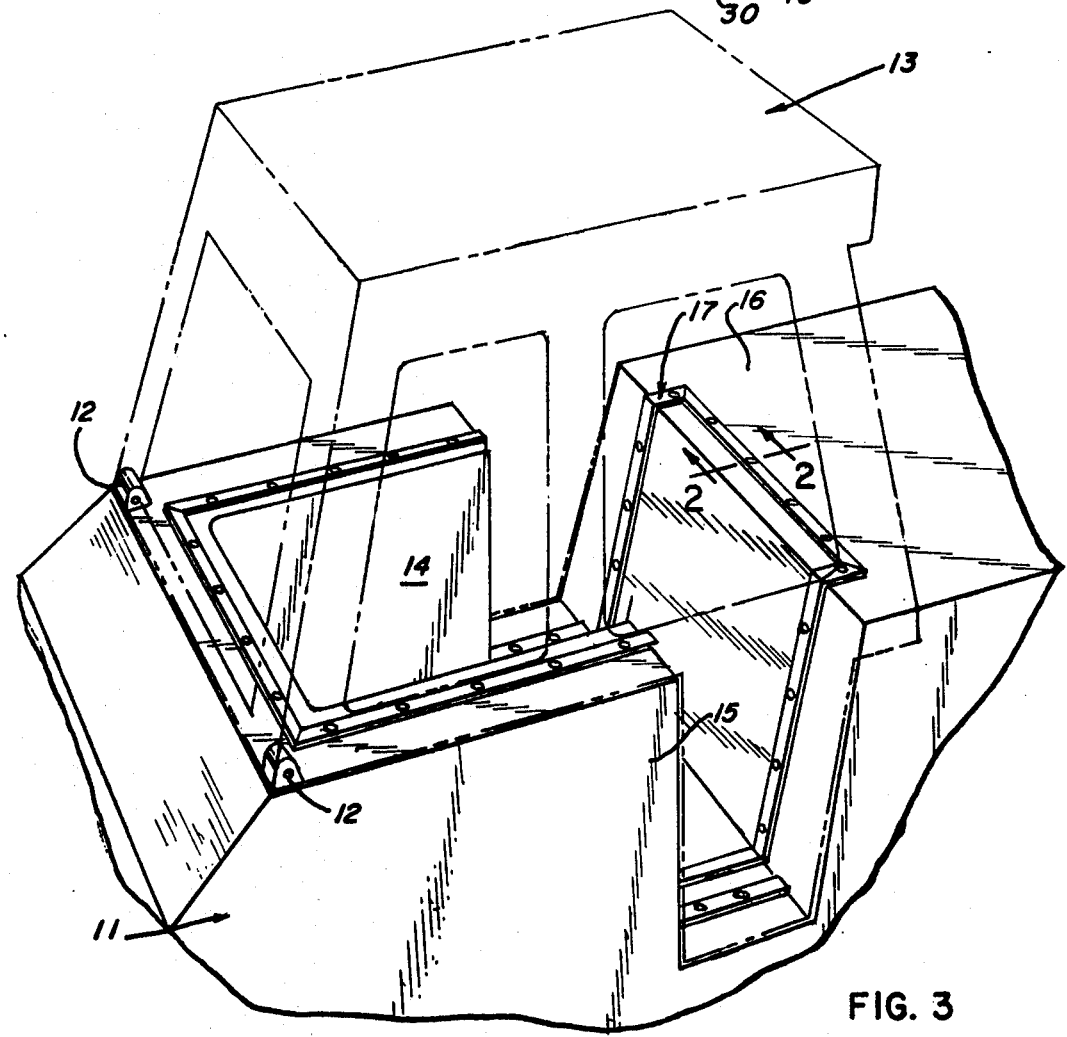
FIG. 3 is a fragmentary perspective view illustrating the arrangement of the joint line seal means.

In the exemplary embodiment of the invention as disclosed in the drawing, a vehicle generally designated 10 illustratively comprises a tractor having a base portion 11 to which is pivotally mounted, as by pivot 12, a cab 13. In the installed arrangement of the cab relative to the base portion, as shown in FIG. 3, the cab and base portion cooperatively define an operator space 14. More specifically, the base portion may define an operator's platform 15 and a dash 16 which, in cooperation with the cab 13, define the operator space 14.

Figure 2:
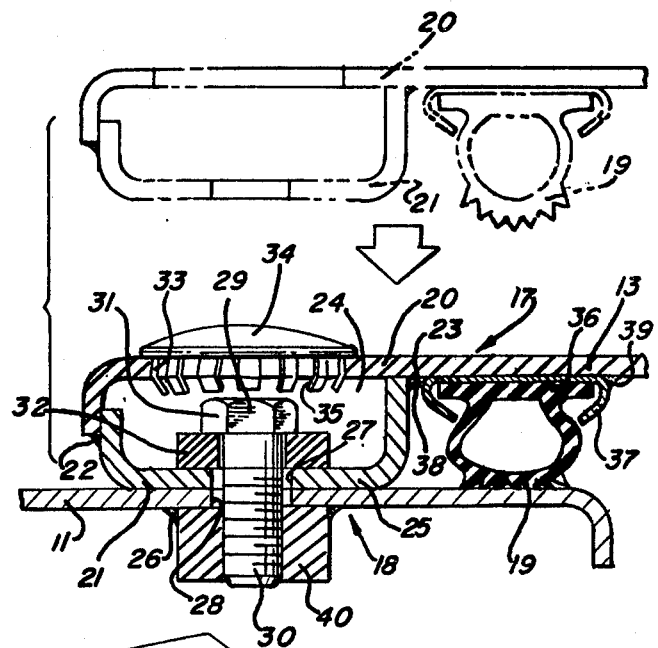
FIG. 2 is a fragmentary enlarged horizontal cross section taken substantially along the line 2—2 of FIG. 3 with the structure thereof being shown further in dotted lines in a position prior to the securing of the assembly thereof.

As indicated briefly above, the present invention is concerned with the sealing of the cab to the base portion of the vehicle such as for preventing the transmission of sound therebetween. As shown in FIG. 2, the improved joint line sealing means generally designated 17 includes a securing portion 18 and a seal 19. As shown therein, when the securing portion 18 is arranged to secure the peripheral portion 20 of the cab 13 to the base portion 11 of the vehicle, the seal 19 is sealingly compressed between the peripheral portion 20 and the base portion 11 to provide the desired seal therebetween.

More specifcally as shown in FIG. 2, the securing portion includes a channel member 21 which is secured to the cab peripheral portion 20 as by welds 22 and 23 to extend lengthwise along the cab peripheral portion 20 and to define therewith a channel 24. The channel member 21 includes a web portion 25 which, in the secured arrangement of FIG. 2, engages the vehicle base portion 11 thus limiting the amount of compression of the seal 19.

The securing means includes threaded elements permitting removable securing of the cab in the mounted disposition of FIG. 3 to the base portion 11 of the vehicle. In the illustrated embodiment, the first portion of the threaded securing means illustratively comprises a nut 40 which may be secured to the base portion 11 as by weld 26.

Web 25 of the channel member 21 is provided with a plurality of spaced openings 27 and base portion 11 is provided with a corresponding plurality of similar openings 28.

The securing means further includes a plurality of bolts 29 having shank portions 30 adapted to extend one each through the respective aligned openings 27 and 28 to have threaded engagement with the nuts 40, as shown in FIG. 2.

The bolts further include head portions 31 received in the channel 24. In the illustrated embodiment, washers 32 are provided to extend between the bolt heads 31 and web 25 of the channel member. Thus, when the bolts are manipulated into threaded securing relationship with the nuts 40, they cause a positive clamped securing of the channel member 21 to the base portion 11 of the vehicle along the length of the peripheral portion 20.

As can be seen in FIG. 2, the channel member 21 cooperates with the peripheral portion 20 of the cab to define a bos section reinforcement, or stiffener, at the peripheral portion effectively eliminating any tendency of the peripheral portion to deform under the clamping action of the bolt securing means. Thus, a uniform sealing compression of the seal is effected along the length thereof to provide an improved positive seal of the cab to the vehicle base portion.

As further illustrated in FIG. 2, the peripheral portion 20 of the cab may be provided with a plurality of access openings 33 permitting facilitated manipulation of bolt head 31 in the channel 24 through the peripheral portion 20 of the cab. Openings 33 may be selectively closed by suitable closure elements 34 which, as shown, may be relatively flat and, thus, substantially flush with the peripheral portion 20 of the cab. The closures may include spring fingers 35 for releasably retaining the closures in place across the openings 33.

In the illustrated embodiment, the seal 19 comprises an elongated hollow seal having a mounting portion 36 received in a suitable channel-shaped retainer 37 secured to the cab peripheral portion 20 as by suitable welds 38 and 39. Thus, the base portion 36 of the seal may be slidably received in the channel retainer 37 for facilitated installation and servicing as desired.

As shown in broken lines in FIG. 2, the uncompressed projection of the seal 19 is substantially greater than the projection of the channel member 21 from the cab peripheral portion 29 so that when the cab is secured to the vehicle base portion, as shown in full lines in FIG. 2, the seal 19 is effectively sealingly compressed between the cab portion 20 and vehicle base portion 11 to provide the desired positive prevention of noise transmission therebetween.

Figure 1:
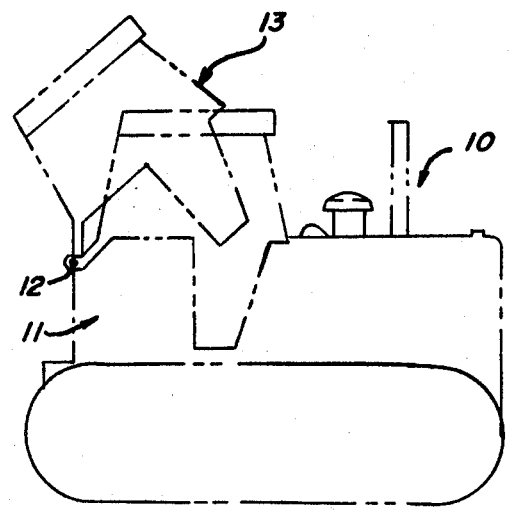
FIG. 1 is a side elevation of a vehicle having a cab and base portion sealingly joined by an improved joint line sealing means embodying the invention.

As shown in FIG. 3, the joint line sealing means 17 extends substantially continuously along the entire joint line between the cab 13 and vehicle base portion 11 about the operator's space 14. When it is desired to pivot the cab to the broken line position of FIG. 1, the respective bolts 31 are unthreaded from the nuts 40 to release the cab for pivotal movement about the pivots 12, as indicated above. When the cab is returned to the normal position shown in FIG. 3, the bolts may be readily rethreaded to the nuts 40 through the openings 33 in the cab peripheral portion 20 so as to again secure the cab to the base portion of the vehicle with the seal 19 effectively positively sealing the joint against noise transmission and the like. Thus, servicing of the vehicle in the operator space 14 is facilitated.

In the illustrated embodiment, the openings 27 and 28 are preferably made substantially larger than the outer diameter of the bolt shank portion 30 so as to permit facilitated alignment of the bolts with the nuts 40 without the need for close tolerances in the mounting of the nuts to the base portion 11 of the vehicle. Thus, as shown in FIG. 2, both the bolt heads 31 and the washer 32 may have a transverse extent substantially larger than the cross section of the openings 27 and 28 so as to permit positive clamping of the channel web portion 25 to the base portion 11 by suitable lateral positioning of the bolt shank 30 within the oversize openings 27 and 28. In the illustrated embodiment, the openings 27 and 28 may have a diameter of ⅝ inch where the bolt shank diameter is ⅜ inch.

As the joint line sealing means 17 extends not only about the operator's platform 15 but also about the dash portion 16 of the vehicle, the dash and other associated portions of the vehicle may be permitted to remain fixedly associated with the base portion 11 when the cab is tilted to provide free access to space 14 for further facilitating servicing of the vehicle.

The foregoing disclosure of specific embodiments is illustrative of the broad inventive concepts comprehended by the invention.

The embodiments of the invention in which an exclusive property or privilege is claimed are defined as follows:

1. In a vehicle having a base portion and a cab defining with said base portion an operator's space, an improved joint line means for sealing the peripheral portion of the cab to the base portion comprising:

channel means secured to said cab defining a projecting channel extending lengthwise along said cab peripheral portion, said channel means defining a web portion spaced from said peripheral portion and having spaced openings therein;

cooperating threaded securing means having a first portion secured to said vehicle base portion and a second portion having a manipulating portion received in said channel permitting threading of said second securing means portion to said first securing means portion to secure said channel means to said vehicle base portion along the length of said channel web at said openings; and a compressible seal means adjacent said channel means extending lengthwise parallel thereto, said seal means having an uncompressed thickness greater than the projection of said channel means whereby said seal means is sealingly compressed between said cab peripheral portion and said vehicle base portion as an incident of the securing of the cab to said base portion by said threaded securing means.

2. The vehicle structure of claim 1 wherein said threaded securing means comprises a plurality of female threaded members secured to said vehicle base portion at preselected positions corresponding to the disposition of said openings and a corresponding plurality of male threaded members having head portions received in said channel and shank portions extending through said openings to be threaded one each to said respective female members.

3. The vehicle structure of claim 1 wherein said threaded securing means comprises a plurality of female threaded members secured to said vehicle base portion at preselected positions corresponding to the disposition of said openings and a corresponding plurality of male threaded members having head portions received in said channel and shank portions extending through said openings to be threaded one each to said respective female members, said holes having a cross section substantially larger than the diameter of said shank portions to permit facilitated alignment of the male threaded members with the female threaded members.

4. The vehicle structure of claim 1 wherein said threaded securing means comprises a plurality of female threaded members secured to said vehicle base portion at preselected positions corresponding to the disposition of said openings and a corresponding plurality of male threaded members having head portions received in said channel and shank portions extending through said openings to be threaded one each to said respective female members, said holes having a cross section substantially larger than the diameter of said shank portions to permit facilitated alignment of the male threaded members with the female threaded members, said threaded securing means further including washers on said shank portions interposed between said head portions and said channel means web portion, said washers having a transverse extent substantially larger than the cross section of said openings.

5. The vehicle structure of claim 1 wherein said threaded securing means comprises a plurality of female threaded members secured to said vehicle base portion at preselected positions corresponding to the disposition of said openings and a corresponding plurality of male threaded members having head portions received in said channel and shank portions extending through said openings to be threaded one each to said respective female members, said holes having a cross section substantially larger than the diameter of said shank portions to permit facilitated alignment of the male threaded members with the female threaded members, said head portions having a transverse extent substantially larger than the cross section of said openings.

6. The vehicle structure of claim 1 wherein said cab peripheral portion is provided with access openings aligned one each with said channel means openings for permitting manipulation of said threaded securing means manipulating portions in said channel.

7. The vehicle structure of claim 1 wherein said cab peripheral portion is provided with access openings aligned one each with said channel means openings for permitting manipulation of said threaded securing means manipulating portions in said channel, and closure elements removably closing said access openings.

8. The vehicle structure of claim 1 wherein said channel means defines with said cab peripheral portion a box frame section.

9. The vehicle structure of claim 1 wherein said channel means is welded to said cab peripheral portion.

10. The vehicle structure of claim 1 wherein said seal means comprises a hollow strip means.

11. The vehicle structure of claim 1 wherein said seal means includes a retainer secured to said cab peripheral portion and a resilient sealing portion slidably removably fitted to said retainer portion.

12. The vehicle structure of claim 1 wherein said vehicle base portion sealed by said sealing means includes an operator's platform and a dash.

13. The vehicle structure of claim 1 including means for pivotally mounting the cab to the vehicle base portion to provide free access to said operator's space upon removal of said threaded securing means second portions.

14. The vehicle structure of claim 1 wherein each said threaded securing means first portion comprises a nut welded to said vehicle base portion, and a bolt removably extended through a corresponding channel means opening into threaded engagement with said nut, said bolt clamping said cab peripheral portion rigidly to said vehicle base portion.

* * * * *